United States Patent
O'Connor

(10) Patent No.: US 9,979,748 B2
(45) Date of Patent: May 22, 2018

(54) DOMAIN CLASSIFICATION AND ROUTING USING LEXICAL AND SEMANTIC PROCESSING

(71) Applicant: Cisco Technology, Inc., San Jose, CA (US)

(72) Inventor: Jeremiah O'Connor, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 187 days.

(21) Appl. No.: 15/167,881

(22) Filed: May 27, 2016

(65) Prior Publication Data
US 2016/0352772 A1    Dec. 1, 2016

Related U.S. Application Data

(60) Provisional application No. 62/167,178, filed on May 27, 2015.

(51) Int. Cl.
*H04L 29/06* (2006.01)

(52) U.S. Cl.
CPC ........ *H04L 63/1483* (2013.01); *H04L 63/145* (2013.01)

(58) Field of Classification Search
CPC ........................... H04L 63/10; H04L 63/0823
See application file for complete search history.

(56) References Cited

U.S. PATENT DOCUMENTS

| | | |
|---|---|---|
| 6,285,999 B1 | 9/2001 | Page |
| 6,799,176 B1 | 9/2004 | Page |
| 7,058,628 B1 | 6/2006 | Page |
| 7,269,584 B2 | 9/2007 | Settle, III |
| 7,457,823 B2 | 11/2008 | Shraim et al. |
| 7,991,710 B2 | 8/2011 | Palatucci et al. |
| 7,870,608 B2 | 11/2011 | Shraim et al. |
| 8,321,935 B1 | 11/2012 | Chen et al. |

(Continued)

OTHER PUBLICATIONS

R. Sarikaya, et al., "Application of Deep Belief Networks for Natural Language Understanding", IEEE/ACM Transactions on Audio, Speech and Language Processing (TASLP), vol. 22, Issue 4, Apr. 2014, 7 pages.

(Continued)

*Primary Examiner* — Ali Shayanfar

(57) ABSTRACT

Domain classification based on lexical and semantic processing of target domains is provided. A target domain name or URL may undergo a lexical analysis to identify language indicating a potential association with malware. In response to a positive identification, the system may identify the domain name as potentially malicious and/or perform additional analysis. A semantic analysis of content associated with the target domain name may be performed. A corpus of information for content associated with malware is provided. The content of the webpage associated with the target domain name may be analyzed and compared to the corpus to identify potential similarity with malicious content. If the content for the target domain name meets a threshold similarity with malicious content from the corpus, the domain name may be flagged as malicious and added to a block list, for example.

20 Claims, 12 Drawing Sheets

(56) References Cited

U.S. PATENT DOCUMENTS

| | | | |
|---|---|---|---|
| 8,369,595 B1* | 2/2013 | Derakhshani | G06K 9/0061 |
| | | | 382/117 |
| 8,448,245 B2* | 5/2013 | Banerjee | G06F 21/51 |
| | | | 709/224 |
| 8,606,926 B2 | 12/2013 | Ulevitch | |
| 8,631,498 B1 | 1/2014 | Hart et al. | |
| 8,676,989 B2 | 3/2014 | Treuhaft et al. | |
| 8,694,642 B2 | 4/2014 | Dempsky et al. | |
| 8,713,188 B2 | 4/2014 | Treuhaft | |
| 8,966,122 B2 | 2/2015 | Treuhaft et al. | |
| 8,966,625 B1* | 2/2015 | Zuk | H04L 63/145 |
| | | | 709/227 |
| 8,977,549 B2 | 3/2015 | Deligne et al. | |
| 9,053,364 B2* | 6/2015 | Mercolino | G07D 7/004 |
| 9,154,475 B1* | 10/2015 | Kailash | H04L 63/08 |
| 9,160,702 B2 | 10/2015 | Dempsky et al. | |
| 9,191,402 B2 | 11/2015 | Yan | |
| 9,276,902 B2 | 3/2016 | Treuhaft et al. | |
| 9,436,678 B2 | 9/2016 | Mathias et al. | |
| 2007/0198603 A1 | 8/2007 | Tsioutsiouliklis et al. | |
| 2007/0226803 A1* | 9/2007 | Kim | G06F 21/552 |
| | | | 726/24 |
| 2008/0208583 A1 | 8/2008 | Jan et al. | |
| 2009/0077383 A1 | 3/2009 | de Monseignat et al. | |
| 2009/0313502 A1 | 12/2009 | Jeong et al. | |
| 2010/0100929 A1 | 4/2010 | Bae et al. | |
| 2010/0145771 A1 | 6/2010 | Fligler et al. | |
| 2011/0185428 A1* | 7/2011 | Sallam | G06F 21/566 |
| | | | 726/24 |
| 2011/0289582 A1* | 11/2011 | Kejriwal | G06F 21/566 |
| | | | 726/22 |
| 2012/0005753 A1 | 1/2012 | Provos et al. | |
| 2012/0023568 A1 | 1/2012 | Cha et al. | |
| 2012/0054869 A1 | 3/2012 | Yen et al. | |
| 2012/0066203 A1 | 3/2012 | Robert | |
| 2012/0166458 A1* | 6/2012 | Laudanski | H04L 51/12 |
| | | | 707/755 |
| 2013/0014253 A1 | 1/2013 | Neou et al. | |
| 2015/0019708 A1* | 1/2015 | Denis | H04L 43/04 |
| | | | 709/224 |
| 2016/0065534 A1* | 3/2016 | Liu | H04L 63/1441 |
| | | | 707/728 |
| 2016/0283347 A1 | 9/2016 | Allen et al. | |
| 2017/0126706 A1* | 5/2017 | Minea | G06F 9/45558 |
| 2017/0337266 A1* | 11/2017 | Bhatt | G06F 17/30699 |

OTHER PUBLICATIONS

David McClosky, Ph.D, Abstract of "Any Domain Parsing: Automatic Domain Adaption for Natural Language Parsing", Brown University, May 2010, A dissertation submitted in partial fulfillment of the requirements for the Degree of Doctor of Philosophy in the Department of Computer Science at Brown University, 88 pages.

Sato, Kazumichi, et al., "Extending Black Domain Name List by Using Co-occurrence Relation between DNS Queries," IEICE Transactions on Communications, Communications Society, vol. E95B, No. 3, Mar. 1, 2012, 8 pages.

Enright, Brandon, "Tracking Malicious Activity with Passive DNS Query Monitoring," Cisco Blog, Oct. 17, 2012, retrieved from the Internet on Jul. 25, 2014: [http://blogs.cisco.com/security/tracking-malicious-activity-with-passive-dns-query-monitoring/], 10 pages.

Wang, Zhiwen, et al., "Co-occurence Relation of DNS Queries Based Research on Botnet Activities," Journal of Networks, vol. 7, No. 5, May 2012, pp. 856-862.

Lee, Jehyun, et al., "Tracking multiple C&C botnets by analyzing DNS traffic," 6th IEEE Workshop on Secure Network Protocols (NPSEC), Oct. 2010, pp. 67-72.

Creighton, T., et al., "DNS Redirect for Protection from Malware," draft-livingood-dns-malwareprotect-02.txt, IETF, Oct. 22, 2010, 22 pages.

O'Connor, Jeremiah, "Utilizing NLP to Detect APT in DNS," OpenDNS Security Labs, Mar. 2015, retrieved from the Internet on May 31, 2016, [https://labs.opendns.com/2015/03/05/nlp-apt-dns/], 10 pages.

* cited by examiner

Cosine Distance b/t Vectors

DOMAIN CLASSIFICATION AND ROUTING USING LEXICAL AND SEMANTIC PROCESSING

CLAIM OF PRIORITY

The present application claims priority from U.S. Provisional Patent Application No. 62/167,178, entitled "Domain Classification and Routing Using Natural Language Processing," by Jeremiah O'Connor, filed May 27, 2015, incorporated by reference herein in its entirety.

BACKGROUND OF THE INVENTION

Embodiments in accordance with the present disclosure relate to computer networks, and particularly to security in computer networks.

Network resources such as those available via the Internet are accessed according to Internet Protocol (IP) addresses. IP addresses are represented numerically, traditionally as a quartet of values having the form 111.111.111.111. From the early inception of network computing, familiar alphanumeric name-based addressing has been used to allow users to more easily locate and remember the addresses for resources. For example, domain names are assigned to computing servers and clients. The domain name system facilitates the translation between IP addresses and domain names by maintaining accessible records that associate one or more domain names with one or more IP addresses.

Malware such as computer viruses, Trojan horses, worms, botnets and the like is often distributed over the Internet as or with network resources. Numerous anti-malware products exist that detect, block and/or remove malware from devices. Over time, particular domain names may become associated with the distribution of malware. So-called block lists have been developed that list domains associated with malware. Domains may be identified for placement on a block list in numerous ways. For example, researchers can retrieve network resources and analyze the content of the resource for the presence of malware. Similarly, software can analyze the content of network resources to detect the presence of malware. Once identified, these domain names can be added to a block list and published for use by network devices. A client device or network router may block the transfer of content from a domain on a block list for example.

DETAILED DESCRIPTION

Figure 1:
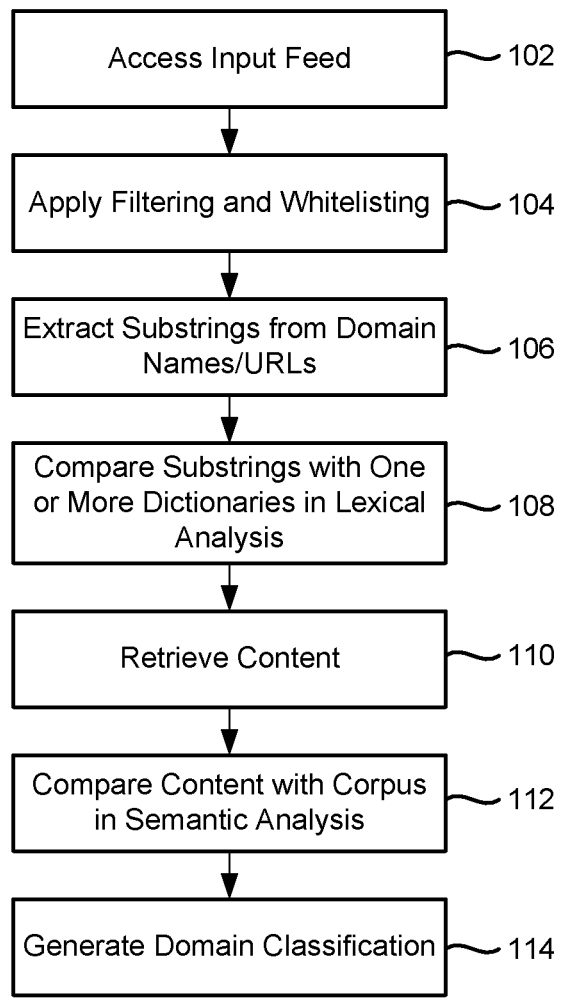
FIG. 1 is a flowchart describing a method of generating domain classifications in accordance with one embodiment.

Systems and methods for domain classification based on lexical and semantic processing of information related to target domains are provided. An unknown or unclassified domain name or universal resource locator (URL) may be identified, in response to a client network request for example. These domains and URLs, broadly referenced as target domains or domain names, are subjected to a textual and semantic analysis to identify potentially malicious domains. A target domain name may undergo a lexical analysis to identify language indicating a potential association with malware. In response to a positive identification indicating an association with malware, the system may identify the domain name as potentially malicious and/or perform additional analysis. A semantic analysis of content associated with the target domain name may be performed. In one embodiment, a corpus of information for content associated with malicious activity, broadly referred to as malicious content, is provided. An identified domain name may be analyzed and compared to the corpus to identify potential similarity with malicious content. If the content for the target domain name meets a threshold similarity with malicious content from the corpus, the domain name may be flagged as malicious and added to a block list, for example.

A target domain name may be parsed or analyzed to extract one or more substrings from the target domain name or URL. These substrings are then compared with one or more databases associated with malicious language used in domain names to identify potentially malicious domain names. In one example, a database of entity identifiers (IDs) is provided that includes a list of entity IDs that identify brand names, company names, and the like that are often misused in connection with malicious activity. For example, many attacks utilize domain names that contain or appear to contain a legitimate brand name or company name. Often, a misspelled or otherwise altered version of the entity ID is used. The substrings from a target domain name are analyzed to identify the presence of an entity ID associated with malware in one example. Various natural language processing techniques including edit distance and regular expression techniques are provided.

In one embodiment, a database of malicious terms is used in place of or in combination with a database of entity identifiers. The system may analyze a target domain name to detect the presence of additional malicious terms such as "update" or "download" that are often used with entity IDs in malicious domain names. In one example, the system may identify a domain name as potentially malicious in response to the presence of a malicious term and an entity ID in the target domain name. In another example, the system may identify a domain name as potentially malicious in response to the presence of multiple malicious terms or a combination of malicious terms in the target domain name.

In response to a lexical analysis identifying a target domain name as potentially malicious, a semantic analysis of content associated with the target domain name is performed in one embodiment. A web page or other network resource may be accessed for a target domain name. The content of the web page, such as images, text, etc. may be converted to one or more content vectors. These vectors are compared to a corpus of content vectors representing malicious content or legitimate content used in connection with malicious activity. The system may identify whether the target domain content has a similarity to any content in the corpus that is above a threshold similarity. If so, the target domain name may be flagged as being associated with malicious activity.

By applying a lexical analysis of domain information such as domain names and URLs, and semantic analysis to content associated with a target domain name, domain names that are potentially associated with malicious activity may be identified. The lexical analysis provides a fraud detection system that uses natural language processing and machine learning processes as well as traffic features to identify malicious activity. Malicious activity such as domain-squatting and brand-spoofing in domain name system and resource level network communication may be detected.

FIG. 1 is a flowchart describing a process for generating domain classifications based on textual and semantic analysis derived from client network requests in accordance with one embodiment of the disclosed technology. While not limited to any particular example, the described process may be implemented using domain name system request information associated with a plurality of clients and a plurality of domains. The process may additionally or alternately be implemented using resource-level request information, such as client HTTP requests for resources from target domains. Moreover, the domain classifications may be used in DNS processing or resource-level processing as described more fully hereinafter.

At step 102, an input feed such as client request log data is accessed. The log may include a table of DNS requests in one example. The table may include for each DNS request, the source IP addresses, the target domain name of the DNS request, and a time associated with the request, such as when the DNS request was received. The log may additionally or alternately include a table of resource-level requests, again containing source IP address, target domain name information, and time information. While not so limited, it is noted that the log data may contain information for many different clients and many different domains. The aforementioned information is exemplary only, as more or less information may be used to identify an unknown or unclassified domain name.

At step 102, the client request log data is optionally pre-processed before analysis to determine classifications. Step 102 may include extracting subsets of information from client requests, for example. Step 102 may include extracting a target domain name, internet protocol (IP) address, and/or specific resource locator such as a universal resource locator (URL).

At step 104, filtering and whitelisting is applied to the input data to optionally reduce the amount of processing. Text processing can be resource intensive. Accordingly, filtering and whitelisting may be applied as an initial step to remove some or as much traffic as possible from examination. In one example, step 106 includes determining whether a domain name, IP address, and/or specific URL, collectively referred to as domain information, has a predetermined classification. If so, these domains may be ignored for further processing. This enables a real-time detection of new domains, new URLs, and/or new IP addresses as they are seen by a network routing cluster such as DNS cluster 320 without overconsumption of computing resources. If a target domain name is a known legitimate site, it can be whitelisted so that it is not subjected to further processing.

In one embodiment, step 104 includes filtering a target domain name using an autonomous system number (ASN) associated with the target domain name. For example, the system may determine whether the ASN of the target domain name matches an ASN associated with an entity identifier determined from one or more substrings of the target domain name. If the ASN's match, the system may remove the target domain name from further processing. The matching ASN's indicate that the target domain name is likely legitimate as it is being hosted on a range of IP addresses associated with the entity identifier, such as a brand name included in the domain information In one embodiment, step 104 includes removing target domain names if they exhibit normal traffic patterns. For example, if the target domain name has had consistent traffic for a period of time it is likely to be a legitimate domain not associated with malware. If so, the target domain name can be removed from further processing.

At step 106, one or more substrings are extracted from the domain information. The system may access any information associated with a target domain name to extract the substrings at step 106. For example, the system may extract one or more substrings from the target domain name itself, from the target URL, or from other information such as a title associated with the target URL for example.

Any number of substrings may be extracted at step 106. Step 106 may optionally include the application of stemming to one or more of the extracted substrings. For example, step 106 may include generating stemmed terms (or stems), such as "updat" from an extracted substring such as "update." In this way, the stemmed substring can be used to represent all relevant substrings such as "update," "updating," "updated," "updates," etc.

At step 108, the extracted substrings are compared with one or more dictionaries or other repository of terms such as a database. In one embodiment, step 108 includes determining if one or more of the substrings match an entity identifier in the entity identifier DB. If there is a match, the system determines whether there is an additional substring in the domain information that could be associated with malicious activity. A database of terms that are associated with malicious activity may be used. For example, stemmed terms such as "updat," "install," "mail," "news," "soft," "serv," "game," "online," "auto," "port," "host," "free," "login," "link," "secur," "micro," "support," and "yahoo." These are just examples of terms that may be used. Any term that often appears in association with malicious activity may be used. If the system determines that the domain information such as the domain name includes an entity identifier coupled with one of these terms, it may flag the domain name as potentially associated with malicious activity. The domain name may be classified as malicious in one embodiment. In another embedment, the domain name may be flagged for additional processing.

It is noted that the system may flag a domain name or determine that a domain name is malicious without the presence of an entity identifier. For example, the system may analyze the domain information for the presence of any combinations of terms that are often associated with malicious activity. For example, the system may determine whether the domain name includes two or more terms associated with malicious activity. Various combinations or numbers of terms may be used to determine that a domain name is associated with malicious activity or should be flagged for additional processing such as content analysis.

For any target domain names that are flagged during the lexical analysis, the content associated with the target domain name is automatically retrieved at step 110. Step 110 may include accessing and downloading the content from the target domain name, an index page associated with the target domain name, or from a URL received directly in the input feed. In another example, step 110 may include retrieving the content from a URL included in an email.

At step 112, the system compares the retrieved content with a corpus including information describing content associated with malicious activity. In one embodiment, the corpus is a database including vector-based information representing the content of web pages, for example, that are associated with malicious activity. The information may include information derived from malicious pages directly, and/or from legitimate pages that are often copied or "spoofed" for malicious activity. For example, the information may include vectors representing the homepage of a banking website, or vectors representing a malicious page that has copied all or part of the banking website in an effort to deceive users.

The system may determine if the retrieved content meets a threshold similarity with any content of the corpus. For example, the system can determine a document in the corpus having the highest similarity score with the retrieved content. If the score is above a first threshold, the system can determine that the target domain name is associated with malicious activity. In another example, if the score is below the first threshold but above a second threshold, it can be flagged for further analysis, either automated or human-based.

At step 114, a domain classification is determined for unknown domains or unclassified domains based on the lexical and semantic analysis. Various thresholds or other techniques may be used at step 114. For example, a low threshold may be established and a high threshold may be established. If a domain has a similarity score above a first threshold it may be added to a block list or otherwise denoted as being suspicious or associated with malware. If a domain has a similarity score below a second threshold, it may be white listed or otherwise denoted as being safe and not associated with malware. If a domain has a similarity score between the thresholds it may remain unclassified or subjected to additional analysis. Other examples may include providing various levels of domain classifications based on the actual similarity score. This technique may provide additional information as to the level of security threat a particular domain may pose. As will be described hereinafter, the domain classifications can be used to route DNS requests or resource level requests.

Figure 2:
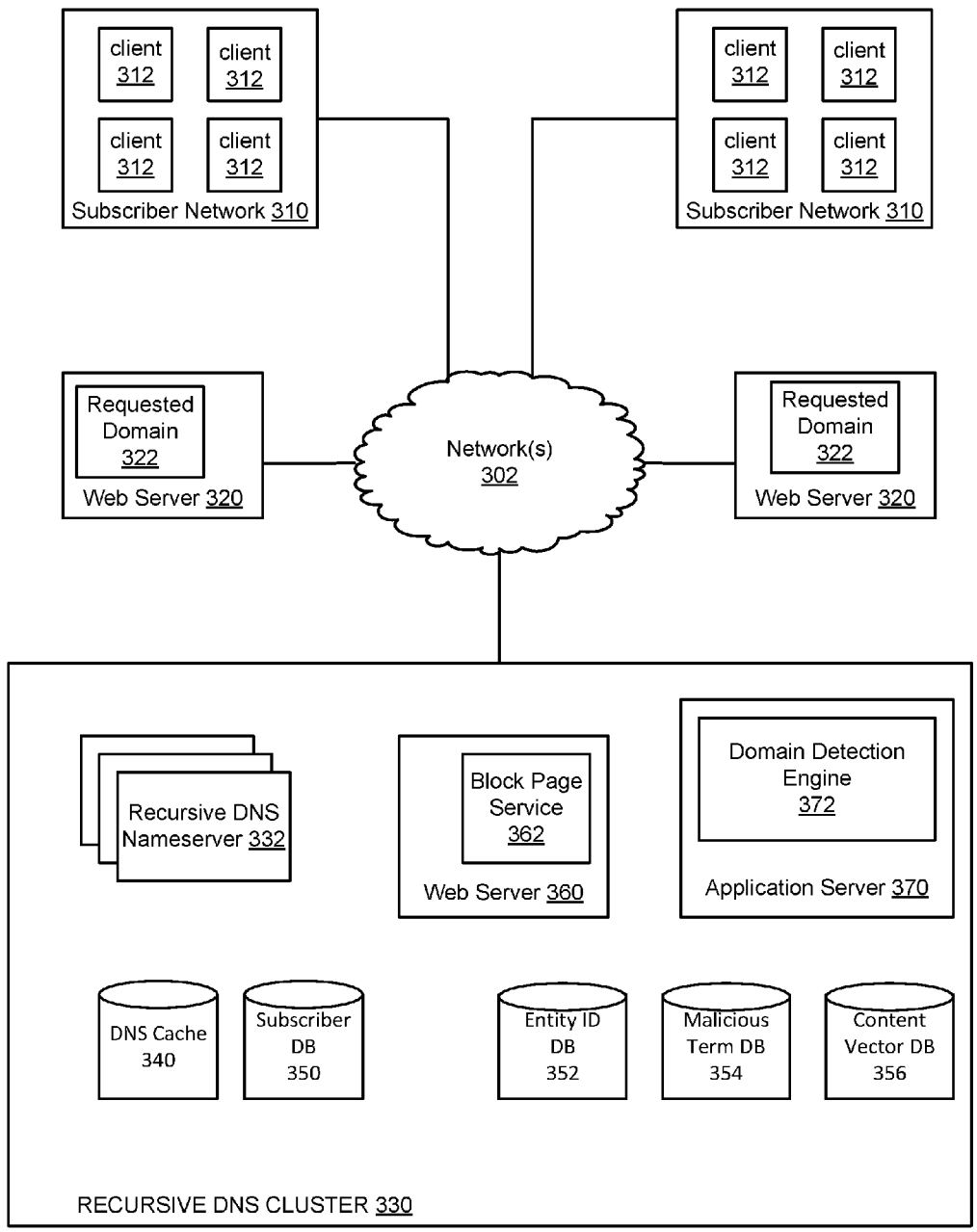
FIG. 2 is a block diagram of a computer network describing the generation and use of domain classifications in one embodiment.

FIG. 2 is a block diagram of a system depicting an example of an implementation of the disclosed technology for domain classification that is used in processing DNS requests and/or resource level requests. Subscriber networks 310, web servers 320 and a recursive DNS cluster 330 are each in communication with one or more network(s) 302.

Network(s) 302 and 310 can include any combination of local area networks, wide area networks (WAN), the Internet, and/or any other network. The recursive DNS clusters can vary by implementation and include any suitable computing system such as a server, group, grid, or distributed platform of computer systems configured to respond to requests for domain name information. While the cluster in FIG. 2 is depicted with multiple recursive DNS nameservers, other embodiments may include a single computing system within a cluster such as a single server. The individual recursive nameservers in a cluster can be formed of hardware and/or software configured as described for domain name resolution. By way of non-limiting example, the various nameservers can include personal computers, servers, workstations, mainframes, etc.

Each of the recursive DNS nameservers in a cluster resolves requests for domain name information from other computing devices such as clients 312. Although two subscriber networks 310 with four clients 312 are shown, any number of subscriber networks or clients may be used. For example, a subscriber network may include a single client 312.

The nameservers 332 in cluster 330 include or are in communication with a local DNS cache 340 and subscriber database 350. While a single cluster is shown in FIG. 2, embodiments may include multiple clusters at various locations that share DNS, subscriber, domain information as described. The domain name information stored in the cache can be any type of information associated with a domain name. Some examples of domain name information are resource records, such as "A" records used for storing a 32-bit IP address associated with a domain name, "AAAA" records used for storing an IPv6 128-bit address associated with a domain name, and "CNAME" or canonical name records for a DNS alias. A request for domain name information can include a packet, cell, message, or signal used to ask for domain name information.

The DNS cache 340 at each cluster facilitates more efficient responses to DNS requests by storing domain name information such as DNS records corresponding to previously received DNS requests. The cache may also store other domain name information, such as pre-fetched domain name information. If the cache contains the DNS record(s) needed to respond to a DNS request, the DNS nameserver can return the cached information without contacting other nameservers to fulfill the request. When DNS requests from client 312 or other computing devices cannot be fulfilled with cached domain name information, the recursive DNS cluster initiates recursive processing to determine the needed information. For example, a DNS nameserver 332 may first issue a DNS request to one of the root servers for generic top level domain information, followed by one or more DNS requests to various authoritative name servers to determine the requested domain name information.

A response can also include a packet, cell, message, or signal used for transmitting domain name information. A Uniform Resource Locator (URL) identifies resources available through network hosts. Some examples of URLs are http—HTTP resources, https—HTTP over SSL, ftp—File Transfer Protocol, mailto—E-mail address, ldap—Lightweight Directory Access Protocol lookups, file—resources available on the local computer or over a local file sharing network, news—Usenet newsgroups, gopher—the Gopher protocol, telnet—the TELNET protocol, and data—the Data: URL scheme for inserting small pieces of content in place. Typically, a URL includes domain names that form a portion of the URL.

In response to a DNS request for domain name information associated with a domain name, a recursive DNS nameserver within a cluster can determine a client identifier. A client identifier discriminates the sender, owner, user, or subscribing entity associated with the request for domain name information. Some examples of a client identifier are IP addresses, user id's, and secure tokens. If an IP address identifier is used, the recursive DNS nameserver can inspect the network packet containing the request to determine the source IP address of the packet. A username or secure token may be included in the request for domain information from which the recursive DNS nameserver determines the client identifier and the client information. In one example, a device or application on a subscriber's network is setup to modify DNS requests to include such identifiers.

In one example, the client identifier is a subscriber identifier and the client information is subscriber information. The client identifier can identify the entire subscriber network or an individual client within a subscriber network. A subscriber is generally an individual and/or entity that agrees to service conditions of an operator of a recursive DNS cluster 330. Subscribers may range from entities operating large networks 310, such as those provided by a wireless service providers or large corporations, to individuals having a home internet connection. It is noted that while subscriber networks 310 are depicted with multiple clients 312, that is not required. In a simple example, the subscriber may operate a single personal computer as a client with an internet connection.

The recursive DNS nameserver resolves a particular request for domain name information based on the subscriber information to generate a response. The recursive DNS nameserver returns the response to the client or a user associated with a client, providing the resolved domain name information in accordance with the subscriber information. By way of example, a substitute network (e.g., IP) address that satisfies a substitution criterion for the domain name in the request for domain name information may be obtained. The network and user records may specify one or more DNS resolution options, filters, features or other techniques for determining what IP address to resolve for a given domain name. For example, in providing DNS services to the DNS client, the DNS servers may provide resolved domain name information or redirect the DNS client to another location based on subscriber information stored at the DNS servers that indicates how an end user wants the DNS servers to employ the DNS resolutions options or features. In various examples, the DNS cluster may provide various DNS resolution options or features, such as misspelling redirection, parental filters, domain blocking, or phishing protection through the DNS process.

In some embodiments, a user or subscriber of a service provided by the DNS cluster may set one or more preferences or selections for how the options are to be enabled or otherwise applied when a DNS nameserver 332 resolves DNS queries associated with the user. Preferences or settings for a user or subscriber may be stored as subscriber information at subscriber database 350 or in one or more storage devices accessible to the DNS cluster 330. Upon identifying the user, subscriber information associated with the user may be used to alter the IP address in a DNS response that the user receives. For example, a user or subscriber may establish subscriber information that instructs the DNS nameserver to alter responses to DNS requests that are associated with malware, adult web sites, potential phishing or pharming sites, and other sites deemed inappropriate by the user or to which the user wishes to block or filter access, etc. In FIG. 2, the web server and nameserver utilize a single database but individual databases containing the same information may be used in other embodiments.

Network records may be included in subscriber database 350 that specify preferences or selections for resolving domain name queries associated with a particular subscriber's network 310. A subscriber may set permissions and preferences in network records to indicate that certain preferences can be bypassed by particular users of the subscriber's network. For example, an administrator for a corporate network 310 may set up network records to allow certain users of network 310 to bypass particular preferences in the network records, such as those blocking access to certain domains. Alternatively or additionally, permissions and preferences for overriding network preferences may be included in user records. User records can include subscriber information for individual users or entities using the services of DNS cluster 330. An individual user may specify resolution preferences or selections that will apply to individual DNS requests issued by the user. DNS nameserver 332 can use a subscriber identifier such as a userid, token or other identifier to determine a corresponding user record for a particular request. The user records and/or network records may be used by a block page service 362 in processing user resource requests. User records and network records may be used together to determine a set of permissions or preferences for applying to any individual request for domain name information, or requests for actual resources as will be explained hereinafter. For example, a user may set a preference in a user record allowing access to a certain category of domains, while a network record may indicate that users are not allowed to override the network preference set by the subscriber. In this manner, the nameservers 332 and/or block page service 362 operating as set forth below may use both types of records in responding to a resource request or DNS request. This permits a user to define a set of user preferences that can be applied when using different subscriber networks 310.

The domain name records in cache 340 may be associated with or have therein one or more flags. A flag can be any indicator, marking, or symbol associated with a domain name. For example a binary indicator stored in the domain name record can be used. A flag may be used to identify any type of information for a particular domain. For example, a flag may be used to mark a domain name as suspicious or untrustworthy, such as a site associated with malware or engaged in pharming or phishing activities. A flag may also indicate that a domain hosts illegal material, hate speech, pornography, material related to drugs or alcohol, or otherwise objectionable material that a subscriber does not wish to access or permit access to. Any number of flags can be used to create any number of categorizations for domain names. For example, flags denoting various levels of adult material may be used to classify domain according to their age-appropriateness. Different levels of security risks may be denoted by flags. Flags can also be set in domain name records to cause requests for a particular domain to be proxied. This can allow a subscriber to have traffic for certain domain names proxied, for example for logging, auditing and the like, while traffic for all other domains is not proxied.

When a request for domain name information is received, the DNS nameserver 332 resolves the domain name query using the subscriber information and any flags in the domain name record. For example, a network record for a DNS request may set a preference that a particular category of domains or a particular domain is to be blocked from access by devices on the network. If a DNS request is for a domain having a flag matching such a preference in the network record, the DNS nameserver may generate a DNS response with a substitute IP address that directs the client device to an alternate domain. In one example, the DNS nameserver provides the client device with domain name information associated with block page service 362 on web server 360. In response to the client device's resource request, the block page service can provide a block or landing page to the client device, for example, informing the user that the requested domain is not accessible on their network. The block or landing page refers generally to any resource or information provided by the block page service in response to a request for a target domain that is not an actual resource provided by the target domain.

A domain detection engine 372 is configured on an application server 370 that applies filtering, whitelisting, lexical analysis of domain information, and/or semantic content analysis to detect potentially malicious domains. The domain detection engine 372 may generate domain classifications, and additionally generate flags or other domain identifying information based on the domain classifications. The domain classifications can be used to generate flags associated with the domain name records in DNS cache 340 in one example. In this manner, the DNS nameserver 332 can respond to client DNS requests using domain classifications generated by the domain detection engine. For example, the domain detection engine may generate domain information that can be used to populate DNS cache 340 or a domain information database (not shown). Using the domain detection engine 372, particular domains may be determined to be associated with malware or some other classification of domains. The domain detection engine or other component can update DNS cache or other information with a flag indicating that the domain is associated with malware or some other classification. DNS or resource-level requests can be processed using the flags and subscriber information to generate DNS information or resources for the domain. This may include providing a block or landing page or DNS information for such a page in response to a client request. The domain detection engine may also be implemented in a client device, as part of a web browser, email application, or as a stand-alone application, for example.

Subscriber database 350 includes a log reflecting client DNS request behavior. The log includes a record of each DNS request received by a nameserver 332 from a client 312. The log can include a client identifier such as the source IP address of each request, a domain identifier such as the target domain or host name of the request, and time information associated with the request.

Domain detection engine (DDE) 372 generates domain information and domain classifications using the log of client DNS requests from subscriber database 350 in one embodiment. The domain detection engine utilizes the client requests to identify unknown or previously unclassified domains. The domain detection engine can also be used to generate or update a domain classification for domains having an existing classification. The domain detection engine may generate classifications that are used to generate one or more flags for a corresponding domain name record in the DNS cache 340 in one example.

The domain detection engine may alternately or additionally generate domain information and domain classifications using a log of client request behavior associated with block page service 362. This log can be maintained in subscriber database 350. Although principally described as responding to redirections from nameserver 332 away from blocked domains, etc., the block page service 362 can also operate independently of any domain name system services provided by the cluster. In one embodiment, for example, client requests for domains 322 may simply be proxied by the block page service. The information can be tracked similarly to the DNS information to generate domain classifications.

In one embodiment, the domain detection engine 372 receives an unknown target domain name or URL to be classified. Reference hereinafter may be made to target domain name and domain information broadly to include a URL or other location information. The domain detection engine may determine if the target domain name is on one or more whitelists and apply one or more filters to determine if the target domain name should undergo lexical and/or semantic analysis for potential maliciousness. The DDE may determine if the target domain name is associated with an autonomous system number (ASN) that corresponds to an entity ID such as a brand name that is part of the target domain or that is extracted from domain information of the target domain. The DDE may determine if the target domain name has a traffic pattern that matches a predetermined normal traffic pattern. If the target domain name has an ASN that matches that of its entity ID and/or has a normal traffic pattern, it may be ignored or whitelisted. Such target domain names are likely benign and thus do not undergo lexical and semantic analysis in one embodiment.

DDE 372 may perform a lexical analysis on domain information associated with a target domain name or URL to detect language that may indicate a potentially malicious domain name. DDE 372 may perform a lexical analysis including natural language processing on the target domain name, the target URL, and/or other domain information (hereinafter referred to collectively as domain information) to detect potential maliciousness. The lexical analysis may detect features within the domain information of the target domain name by defining a so-called malicious language that represents the language often used in malicious network activity. Data sets of extracted stemmed words (e.g., English) can be used to define a malicious language using a malicious term DB 354 in one embodiment. Additionally, entity identifiers such as legitimate domain names, company names, etc. that are used with malicious activity may be defined in an entity ID database 352. A lexical analysis of domain information using the defined language may be applied to detect potentially malicious domains.

DDE 372 may extract one or more substrings from the domain information such as the target domain name and compare them with the one or more databases of substrings associated with malicious activity. FIG. 2 depicts an entity ID database 352 and a malicious term DB 354 according to one embodiment, however, additional or fewer databases may be used. DDE 372 may compare the extracted substrings with the databases to determine if the target domain information is indicative of maliciousness.

In one embodiment, entity ID database 352 contains a list or other notation of entity identifiers (ID) that may be associated with malicious activity. The entity IDs may include legitimate entity IDs that may be used maliciously by attackers to pass their activities off as those of a legitimate entity. The entity IDs may include legitimate brand names such as that of stores, products, services, etc., popular people names, company names, government names, etc.

In one embodiment, DDE 372 compares the substrings from the target domain information to determine if they match an entity ID from the entity ID DB 352. Various language processing techniques including edit distance and regular expression processes may be used to determine if an extracted substring matches an entity ID from DB 352.

In one embodiment, if the target domain information matches that of an entity ID in the database, DDE 372 determines if the target domain information also includes a substring that matches a term in malicious term DB 354. DB 354 may list or otherwise include a notation of common terms, words, characters, etc. that are used with malicious activity. The terms can be stored as stemmed version of each term so that variations of the terms can be detected. For example, common terms used in APT and phishing attacks may include in stemmed form: mail, news, soft, serv, updat, game, online, auto, port, host, free, login, link, secur, micro, support, and yahoo. Of course, these are just examples and malicious terms DB 354 may list fewer or additional terms.

DDE 372 may determine if the target domain information includes any malicious terms in combination with the entity ID. If both are detected, DDE 372 may flag the target domain name as malicious, or may flag the target domain name for additional content analysis. In one example, DDE 372 attempts to find bigram collocations of words that often occur with each other in fully qualified domain names or URLs. For example, DDE 372 may attempt to find combinations of a brand name (entity ID) with a malicious term (e.g., update) in a target domain name or URL. If this bigram collocation is found, the DDE may flag the domain name as malicious or to undergo content analysis before determining a classification for the domain name. In another example, DDE 372 may look for certain terms or combinations of terms in the malicious terms DB without regard to an entity ID.

DDE 372 automatically retrieves content for a target domain name and performs a content analysis if the lexical analysis indicates an association with malware. If a target domain name is flagged in response to the lexical analysis, DDE 372 performs a content analysis to determine if the target domain name is potentially malicious. DDE 372 retrieves content associated with the target domain name. DDE 372 may access a web page, site, or other source of content for the target domain name. DDE 372 may directly access content using a URL that is received in one embodiment, or may crawl various web pages hosted on the target domain to attempt to locate an index or homepage associated with a target domain name in a DNS implementation for example.

DDE 372 generates one or more vectors using a semantic analysis of the target domain content. DDE 372 compares the one or more vectors with vectors representing malicious content in content vector DB 356. DDE 372 identifies the most similar content represented in DB 356 and determines if the similarity is above a threshold level of similarity. If the target content matches content in the DB, DDE 372 flags the target domain name as malicious in one example. In another example, DDE 372 may flag a target domain for further analysis, such as by human inspection, in response to a similarity above a threshold. In one example, multiple thresholds may be used. If the content similarity is above a first threshold but not above a second threshold, it may be flagged for further analysis. If the content similarity is above the second threshold, it may automatically be flagged as malicious and added to one or more block lists for example.

DDE 372 applies topic modeling to detect potentially malicious content in one embodiment. DDE 372 includes methods for automatically organizing, understanding, searching, and summarizing large electronic archives. This enables discovery of hidden themes in a corpus of malicious content. The documents may be annotated according to themes. The annotations may be used to organize, summarize, search, and make predictions regarding content.

Content vector DB 356 is a corpus representing malicious content such as HTML content of phishing pages for example. The HTML content may be that of a malicious page impersonating a legitimate web page for example, or be the content of the legitimate web page itself. In many cases, the malicious pages are exact or near duplicate copies of a legitimate web page they are attempting to impersonate. The vectors in DB 356 may be generated by building a model of the malicious content. In one embodiment, a word count vector from terms in an HTML document (Query) is determined. A word count matrix over a collection (Corpus) is then generated. Term frequency-inverse document frequency (TF-IDF) can be applied to determine how important or relevant certain terms are to the collection. TF-IDF may apply a balance between the frequency of terms and the term's rarity over all documents. Latent semantic analysis or indexing (LSA/LSI) is applied in one example, to generate a model including terms and the number of documents in which they appear. The analysis generates one or more document vectors which can be stored in the content vector DB. Each vector represents a document such as text, images, etc. of a web page for example.

DDE 372 similarly generates one or more vectors for an input target domain name. The generated vectors are then compared to the vectors in DB 356 to determine if the target domain name is above a threshold similarity with any content represented in the database. In one embodiment, DDE 372 determines the cosine similarity between a vector of a target page and a vector in the corpus to determine a similarity score between the target domain name and those of the corpus. DDE 372 applies a normalized dot product to the vectors generated from word counts of the documents (HTML content) of the target page and reference page in the corpus. DDE 372 transforms terms of an HTML document of a target domain name into vectors and transforms the corpus of malicious documents (pages) to vectors. DDE 372 determines the angle or cosine similarity between the input HTML document term vector and the corpus documents. DDE 372 in one embodiment returns a ranking of the sites with the most similar HTML documents from the corpus corresponding to the target domain name content.

Figure 3:
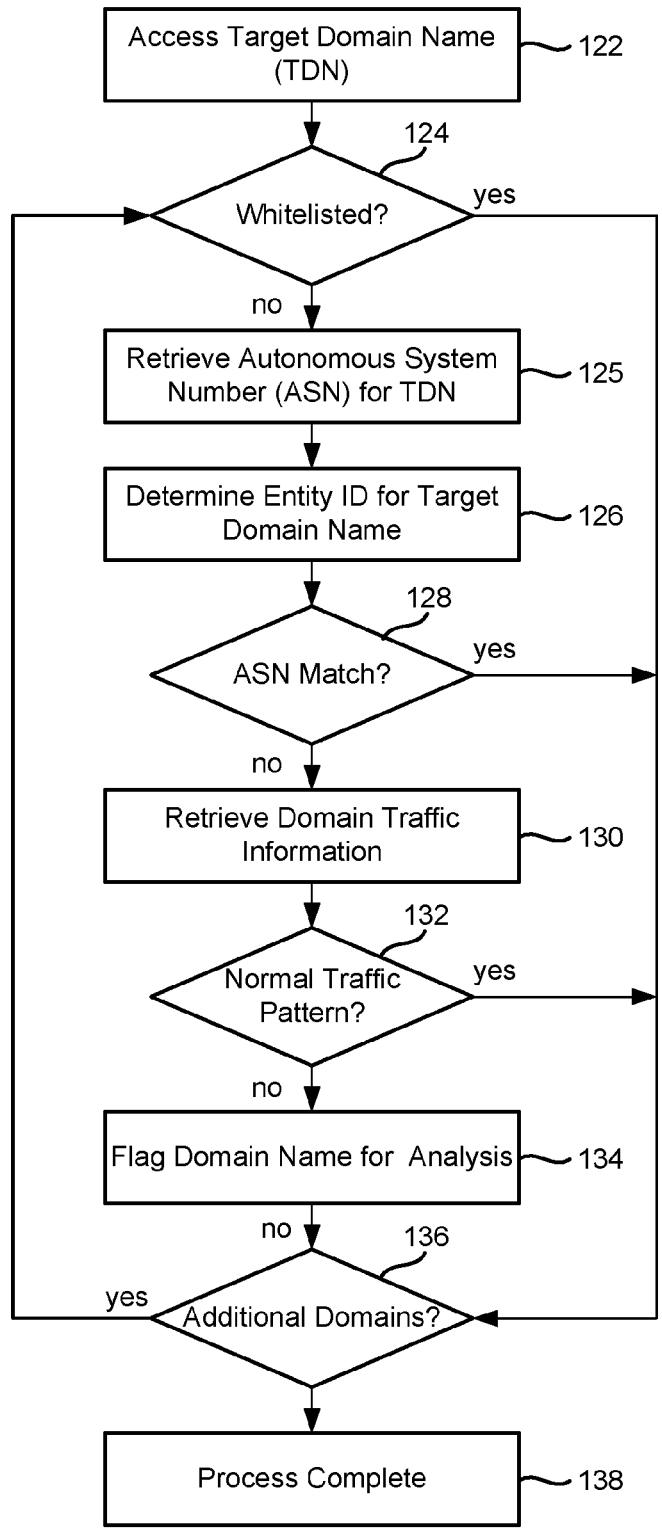
FIG. 3 is a flowchart describing a method of filtering and whitelisting target domain names in one embodiment.

FIG. 3 is a flowchart describing a process of filtering and/or whitelisting an input feed to generate from a set of target domain names a subset of target domain names that is smaller than the set of target domain names. The process of FIG. 3 can be used at step 106 of FIG. 1 in one example. The process may be used to reduce the number of uncategorized domain names that are subjected to additional processing, by lexical and/or semantic content analysis for example. For ease of explanation, reference may be made to an unknown domain or domain name for which a categorization or other identifying information is unknown as a target domain or domain name. Reference may be made to a reference domain or domain name for which malicious identifying information is used in comparison to a target domain name. A reference domain may include a malicious domain, or a legitimate domain that may be copied or spoofed in the furtherance of malicious activity.

At step 124, the system determines if the target domain name is whitelisted. The system can maintain one or more whitelists or other designation of domain names that are believed to be legitimate or otherwise not associated with malware. If the target domain name appears on a whitelist, it can be assumed to be legitimate in one example. Accordingly, further processing of the domain name is not performed. The process proceeds to step 136 to determine if here is an additional domain name to be processed.

If the target domain name is not whitelisted, the system retrieves an autonomous system number (ASN) for the target domain name at step 125. Each organization or entity on the Internet may be referred to as an Autonomous System (AS) which is identified by an Autonomous System Number (ASN). Each ASN has one or more prefixes. An ASN is often associated with an Internet Service Provider, for example. It represents a set of routers operating under specific and/or multiple routing protocols and may represent a prefix under control of one or more network operators.

The system can determine an ASN of the target domain name at step 125. The system may use a database, domain name to ASN mapping service, or IP address to ASN mapping service to determine the ASN of the target domain name. The system can determine an IP address for a hostname using the system database or authoritative DNS queries. The system may determine an ASN for the hostname or a second level domain (SLD) using an IP address to ASN mapping service. A hostname may refer to any subdomain below a second level domain.

At step 126, the system determines an entity identifier (ID) for the target domain name. Step 126 can include determining if any extracted substring from the domain information is associated with an entity identifier listed in an entity ID database. The entity ID database may list popular brand names, company names, peoples' names, etc. Each of these names may be represented by one or more entity IDs. The entity IDs may include stemmed versions of the names in one embodiment.

Using the entity ID, the system determines one or more ASNs associated with the entity ID. The system can maintain a mapping of entity identifiers such as brand names to the legitimate ASN or ASNs that are associated with that entity identifier. The system can maintain a database or other storage of passive DNS information including information from the authoritative logs maintained in response to authoritative DNS requests. The system may use the information to determine an ASN of the entity ID matching the target domain name substring. The system can create a mapping of legitimate entity IDs to their corresponding ASNs. This information is stored in entity ID DB 352 in one embodiment.

At step 128, the system determines if the ASN of the target domain name matches an ASN of an entity identifier (ID) associated with the target domain name. If the ASN of the target domain name matches that of the entity identifier, it can be assumed to be legitimate in one example. Accordingly, further processing for the domain name is not performed. The process proceeds to step 136 to determine if there is an additional domain name to be processed.

At step 130, the system retrieves traffic information associated with the domain name. If the traffic information indicates a normal traffic pattern, the domain name may be assumed to be legitimate and the process proceeds to step 136. For example, the system may determine if the traffic information indicates that the domain name is popular, such as by having consistently high levels of traffic over time. The system may determine that traffic is not normal if there is a recent spike in traffic relative to a previous period, for example. Various heuristics and models to determine whether traffic is normal may be used.

If the traffic information does not indicate a normal traffic pattern, the domain name is flagged for further analysis at step 134. For example, the domain name may be marked for a subsequent lexical analysis of domain information. In an alternate embodiment, the target domain name can be flagged as malicious at step 134. After acting for the target domain name at step 134, the process proceeds to step 136 to determine whether there are additional domains to process. Once all of the domains have been processed, the process completes at step 138. Additional target domain names can be processed as they are identified. For example, the system may perform an analysis in response to a client network request associated with a domain name that is not classified by the system.

Figure 4:
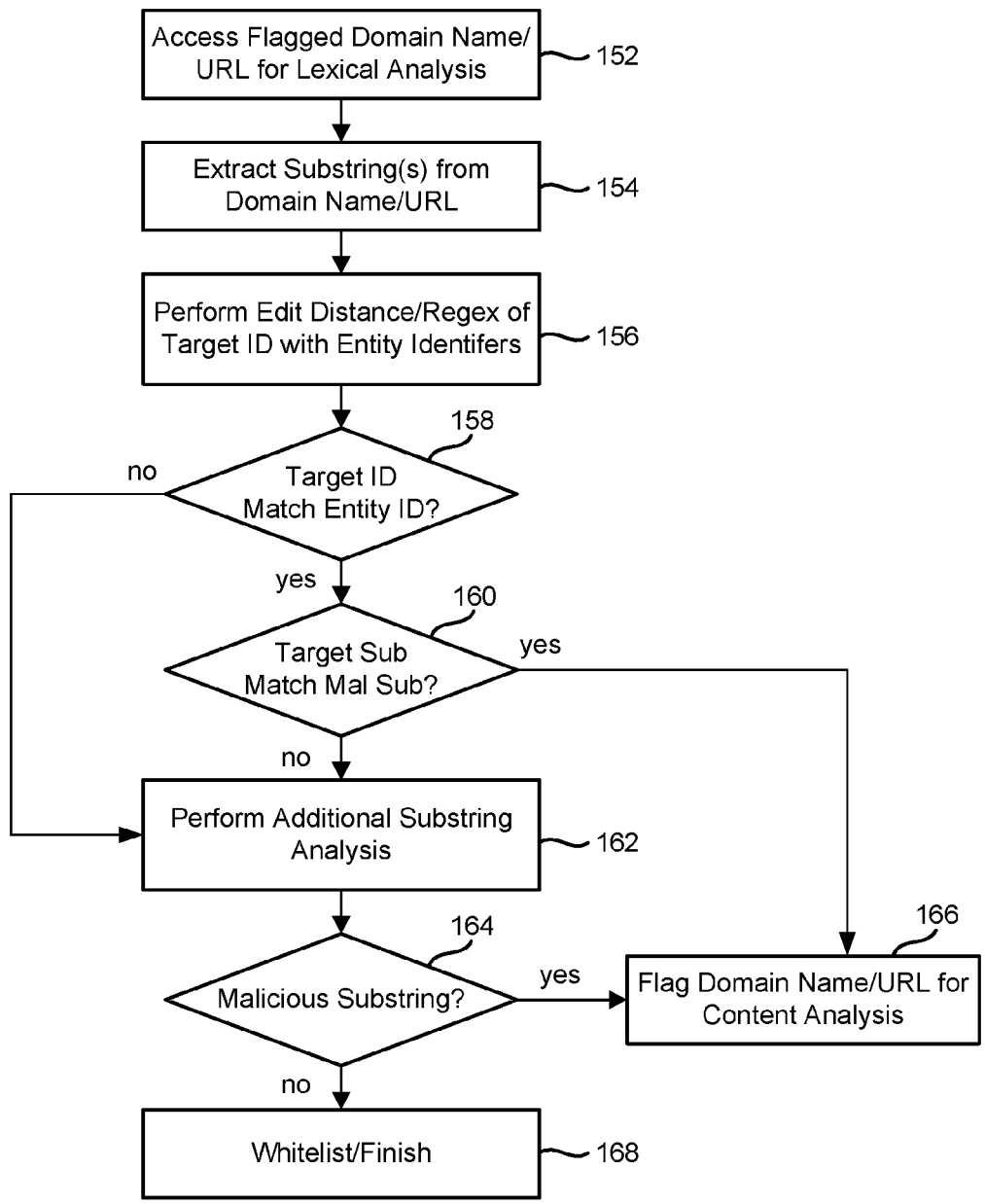
FIG. 4 is a flowchart describing a method of performing a lexical analysis for a target domain name to determine a potential association with malware in one embodiment.

FIG. 4 is a flowchart describing lexical processing of domain information using one or more reference dictionaries or databases associated with malicious activity in one embodiment. The process may be used to compare target domain information with terms in the reference database(s) representing known malicious domain information. For example, the reference databases may include an entity identifier database to detect that the target domain name is asserting a relation to the entity, and/or a malicious terms database to identify terms that may be used in combination with or independently of an entity identifier. FIG. 4 is one example of natural language processing that may be used to detect a target domain name or URL that is attempting to "spoof" or otherwise confuse a user into thinking that the target domain name is associated with an entity when it is in fact not. FIG. 4 is also an example of natural language processing that may be used to detect that a target domain name or URL is associated with malicious activity by the use of language related to previously detected instances of malicious activity. The process of FIG. 4 can be used at step 110 of FIG. 1 in one example.

At step 152, a domain name or URL flagged for lexical analysis is accessed. The domain name may be flagged by a previous as a result of not passing whitelisting or filtering as earlier described. In another example, the system may access any unclassified target domain name or URL without previous whitelisting or filtering to perform a lexical analysis on the domain information to detect potentially malicious activity.

At step 154, the system extracts one or more substrings from the domain name or URL. The system may use any technique for identifying substrings within a string or other combination of characters. The system may identify potential entity identifiers such as brand names, company names, etc. as well as potential terms associated with malicious activity. The system may extract the substring and apply stemming to identify the root of the specific term which may be present in other related terms.

At step 156, the system performs a lexical similarity analysis between an extracted entity ID from the target domain information and an entity identifier selected from the entity ID database. For example, the system may determine the term in the entity ID database which is most similar lexically or textually with the entity ID extracted from the domain information. The system may compare the two terms to generate a similarity score in one example. The similarity score is a measure of the relatedness of the two terms.

In one example, step 156 includes performing an "edit distance" calculation between the target entity ID and the entity ID from the database. The edit distance calculation determines a minimum edit-distance on two substrings to check for the word distance between legitimate and malicious spoofing domains (e.g., malware.com vs. rnalware-.com). The edit-distance algorithm works by determining a minimum edit-distance. A minimum edit distance is a shortest-path, dynamic-programming algorithm that checks for similarity between two strings. The minimum edit-distance between two strings is defined as the minimum number of edits it takes (e.g., insertion, deletion, or substitution) to turn string A into string B. An edit required to change the target string into the reference string is represented as a penalty.

The algorithm determines the least path (sequence of edits), from the target (initial) string to the reference (goal) string.

Consider the following having: an initial state—string being transformed; operations—insert, delete, substitution; goal state—final string; and path cost—minimum number of edits. As an example, consider a target or initial string "ince_ption" and a reference or goal string of _execution. For this example, there are 5 edits required to transform the target string into the reference string. Namely, three substitutions, one deletion, and one insertion are required, making the penalty 5. As another example, consider the example target domain name "whiteh0us3.gov" and reference domain name "whitehouse.gov." For this example, there are two edits. Namely, two substitutions are required making the penalty two. The intuition behind using this algorithm is to essentially define a language used by malicious domains vs. a language of benign domains in DNS or resource level traffic.

In another example, a "regular expression" process is applied in addition to or in place of the edit distance process. The regular expression process, or regex, is used to further identify lexically similar domain names that while similar, may require a substantial number of edits to transform the string and therefore, exceed the threshold number set by the system for an edit distance determination of similarity.

Various regular expressions may be defined that attempt to match character combinations associated with entity identifiers or malicious terms, for example. A regular expression is a pattern that a regular expression engine uses to attempt to match input text with text in a corpus or dictionary. The regular expression pattern may include character literals, operators, or constructs.

By defining regular expression patterns to search for entity identifiers such as brand names, etc., large amounts of domain information from the numerous newly discovered domains can be parsed to detect or find specific character patterns that may be indicative of spoofing for example, by copying a well-known brand name, for example.

Literals, operators, and constructs may be used to define regular expression patterns that are applied to the input text from domain information for a target domain. A syntax language may be used that matches with patterns compatible with the regular expression engine of the system. Input text from domain information of a target domain name may be parsed to detect the regular expression pattern. If the input text such as domain information (e.g., a domain name or URL) matches the regular expression pattern, the system can determine that target domain name is attempting to associate itself with an entity ID such as a brand name, for example.

Other processes may be used in combination with or in place of edit distance and regular expression processes to apply natural language processing to detect potentially malicious domain names. For example, other processes based on automata theory to detect lexical similarities may be used.

At step 158, the system determines if the target entity ID matches an entity ID from the entity ID database. For example, the system may determine the penalty score from an edit distance calculation as a similarity score. If the number of edits is at or below a threshold, such as one for example, the system may determine that the target ID matches the entity ID. If the number of edits is above the threshold, the system may determine that the target ID does not match the entity ID. Domain information such as target ID may be determined to match an entity ID using a regular expression process if the domain information matches a regular expression pattern defined by the system.

If the system determines that the target ID matches an entity ID, one or more additional substrings from the target domain information are compared with a malicious term database at step 160. The malicious term database includes terms (e.g., stemmed versions) that are commonly used in connection with malicious activity. Terms such as "update" or "download" which may often be paired with a spoofed brand name to trick users into thinking the domain name is legitimate may be used. Any term that is used in connection with malicious activity may be used. In one embodiment, terms may be added and/or removed from the malicious terms database over time to better tailor results to identify malicious domains while avoiding false positives where legitimate domains are incorrectly identified as malicious.

In one embodiment, the system applies full matching to determine that a target substring matches a malicious term. While some amount of difference in the terms is used for matching entity identifiers, exact matching may be used for malicious terms to reduce the amount of processing and/or to avoid the inclusion of false positives. The exact matching may be used in conjunction with stemmed terms so that any variation of a malicious term may potentially be detected. In another example, however, an edit distance or regular expression process may be used with malicious terms as well.

By way of example, consider the exemplary domain name "well_knwn_compny-updats.com." This construct represents a common pattern seen in advanced persistent threat (APT) network attacks, such as those attempting to get a user to enter credentials when they access the target URL. The attack attempts to spoof, mimic, or otherwise confuse a user into believing that the attack comes from an entity ID "well_known_company." The entity ID has been modified to "well_knwn_compny" in an attempt to spoof the actual ID. This may be done because the actual entity ID isn't available or for other reasons. The entity ID in its modified form has been combined with a malicious term "updats" when the stems of the terms are compared. These terms are viewed as malicious as they are often used with an entity ID in order to cause a user to access the malicious domain name. The user may believe that "well_known_company" actually wants them to update software on their computer, for example.

By applying natural language processing, this potentially malicious domain can be detected. The substring "well_knwn_compny" can be determined to match the entity ID "well_known_company" using an edit distance, regular expression, or other process. The system can then determine that this entity ID is combined with a malicious term by the presence of the term "updats." The term "updats" matches the stemmed version "updat" of "update." The presence of both substrings may be used to determine that the target domain name is potentially malicious.

If one or more substrings from the target domain information match a term from the malicious term database as determined at step 160, the domain name or URL can be flagged at step 166 for an additional semantic content analysis.

In one embodiment, the system may automatically mark a domain name or URL as malicious, such as by adding it to a block list, in response to an entity identifier matching an entity ID from the database without a matching term in the malicious term database. The system may also flag a domain name or URL for a content analysis in response to a matching entity identifier only. In another embodiment, the system may automatically mark a domain name or URL as malicious in response to a matching entity identifier and matching term in the malicious term database, without performing an additional semantic content analysis.

At step 162, the system optionally compares the extracted substrings with any additional dictionaries that are used to detect potentially malicious domains. Step 162 can be performed to detect potentially malicious domains that do not utilize impersonation of an entity identifier in domain information. Step 162 can be performed to determine if one or more extracted substrings from the domain information match any terms from the malicious terms database to automatically flag a domain name for content analysis. Step 162 may use the same malicious term database as in step 160 or a different database may be used. For example, step 162 may include fewer terms that will trigger a content analysis without a matching entity identifier. In one example, step 162 may look for combinations of terms from the malicious terms database. In this manner, combination of multiple terms from the malicious terms database, independent of an entity identifier, may be used to flag a domain name for content analysis.

In one embodiment, the system applies full matching to determine that a target substring matches a malicious term at step 162. In this manner, specific sequences and combinations of terms may be examined at step 162 to determine that domain information may be associated with malicious activity. In another example, however, an edit distance or regular expression process may be used with malicious terms as well.

At step 164, the system determines if the extracted substring(s) match the necessary combination of independent terms in the malicious terms database. If the target domain information is determined to match the malicious terms language, the domain name or URL is flagged for semantic content analysis at step 166. In one embodiment, step 166 can include automatically generating a domain classification for the target domain name, such as by identifying the target domain name as malicious without a content analysis.

Consider another example of an exemplary domain name that does not include the presence of an entity ID, "updats_install_softwares.eee." This construct also represents a common pattern seen in advanced persistent threat (APT) network attacks. The attack attempts to cause a user to believe that generally there is some computer-related action to take and to therefore access the target domain name with their computer or other machine. The system may include the stemmed terms "updat," "install," and "soft." The system may be configured to detect a potentially malicious domain name at step 164 by the presence of three or more malicious terms in combination, for example. Any type and combination of terms may be used.

If the target domain information does not match any of the malicious substrings as determined at step 164, the target domain name can be whitelisted and the process finish at step 168. In one embodiment, the process finishes without whitelisting the target domain name.

Figure 5:
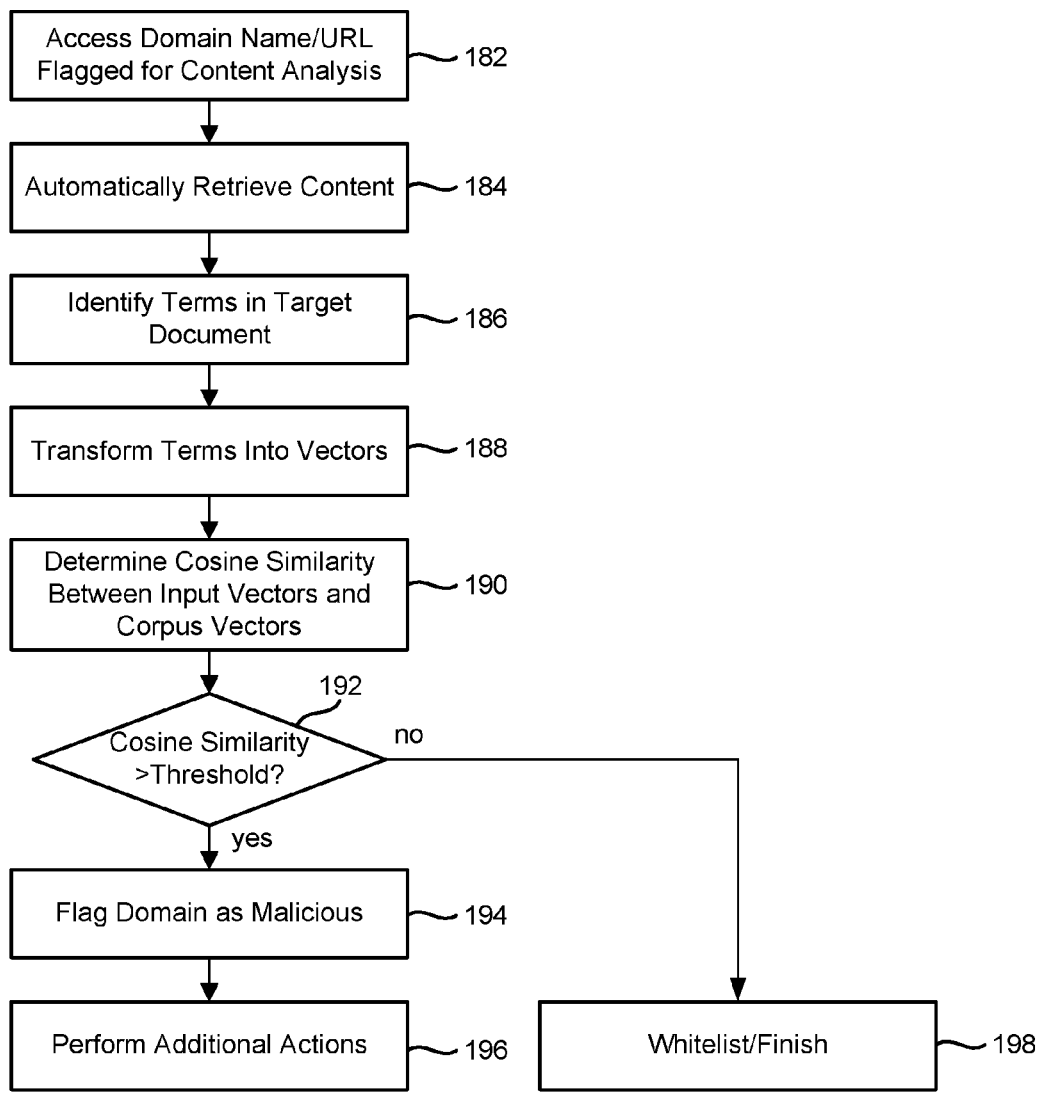
FIG. 5 is a flowchart describing a method of performing a semantic analysis of content associated with a target domain name in one embodiment.

FIG. 5 is a flowchart describing a process for performing a semantic content analysis using a corpus of content associated with malicious activity in one embodiment. The process may be used to compare content associated with a target domain with content in a corpus that represents content associated with known malicious activity. The corpus content that is associated with known malicious activity may include content associated with legitimate domain names or actual malicious content. For example, a legitimate web page from a legitimate domain that is copied and used in a malicious web page from a malicious domain may be included. FIG. 4 is one example of a content analysis that may be used to detect a target domain name or URL that is attempting to "spoof" or otherwise confuse a user into thinking that the target domain name is associated with an entity when it is in fact not. FIG. 5 is also an example of semantic analysis that may be used to detect that a target domain name or URL is associated with malicious activity by the use of content related to previously detected instances of malicious activity. The process of FIG. 5 can be used at step 112 of FIG. 1 in one example.

At step 182, a domain name or URL flagged for semantic analysis is accessed. The domain name may be flagged in response to a lexical analysis of the domain information as earlier described. In another example, the system may access any unclassified target domain name or URL without a previous lexical analysis of the domain information to detect potentially malicious activity.

At step 184, the system automatically retrieves content associated with the target domain name or URL. Step 184 may include retrieving the content identified by a URL or domain name directly. In one specific example, the system may begin with a target domain name and search or crawl to discover an index or homepage associated with the domain name. In this manner, the system may access the most relevant content that may be associated with malicious activity and particularly content that is spoofing legitimate content.

At step 186, the system identifies terms from the text in the retrieved content. In one example, the system performs a word count for each term in the target content. At step 188, the system generates one or more vectors from the target content. For example, word count vectors may be determined that represent the frequency of the term within the document. This may be referred to as term frequency, representing the frequency of a term as the number of times a term appears in a document. The vectors may undergo term frequency (TF) and inverse-document frequency (IDF) analysis and conversion in one example. The TF-IDF analysis may be used to generate a TF-IDF score or vector. The TF-IDF score or vector may further undergo LSA/LSI analysis to generate one or more vectors representing a semantic analysis of the terms in the target content.

At step 190, the system compares one or more input vectors from the target content with a corpus of vectors representing malicious content or legitimate content that is used in association with malicious activity. The corpus may be built using a collection of HTML or other content representing malicious content such as phishing pages. The corpus may include content from legitimate sources, such as brands or entities that are impersonated by a phishing page, for example. The corpus of content may include vectors representing the content of the phishing and/or legitimate pages. The vectors may be generated in the same way as the target content vectors. The content of the malicious of impersonated legitimate page may be converted to word count vectors, TF-IDF vectors, and/or LSA vectors.

Step 190 may include determining the cosine similarity between one or more input vectors from the target content with one or more vectors from the corpus content. The cosine similarity is determined in one embodiment using the normalized dot product of the two vectors being compared. The cosine distance can be computed from the components of the two vectors. The cosine similarity between the target vector and vectors in the corpus of malicious pages may be determined. The angle (cosine similarity) between the input content vector and the corpus content vectors are determined. The system returns a ranking of pages from the corpus that are the most similar to the target content. The system may determine a cosine similarity score for the most similar document.

At step 192, the system determines if the cosine similarity or other measure of the target content's similarity to the corpus content is at or above a threshold similarity. If the content is determined to be at or above the threshold, the system can flag the target domain name as malicious at step 194. The system may optionally perform additional actions at step 196. For example, the system may add the target domain name to one or more block lists or other lists used to identify malicious content that should be avoided. The system may also tag or otherwise identify the entity identifier such as brand name as being associated with malicious activity. The system may optionally email or otherwise send results to an administrator. Additionally, the information may be used to build training sets and add to the corpus. The system may periodically retrain the corpus using this information as well as by retrieving legitimate content that is being used in association with malicious activity.

If the target domain information does not match any of the corpus vectors with a similarity above the threshold, the target domain name can be whitelisted and the process finish at step 198. In one embodiment, the process finishes without whitelisting the target domain name.

Figure 6:
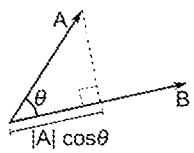
FIG. 6 is a diagram describing a process for determining a cosine similarity between two content vectors in one embodiment.

FIG. 6 is a diagram showing the calculation of cosine distance between two vectors. The calculation of FIG. 6 may be used at step 190 of FIG. 5 in one embodiment. The calculation determines the cosine distance between an input vector In[1] and an output vector Out[1].

Figure 7:
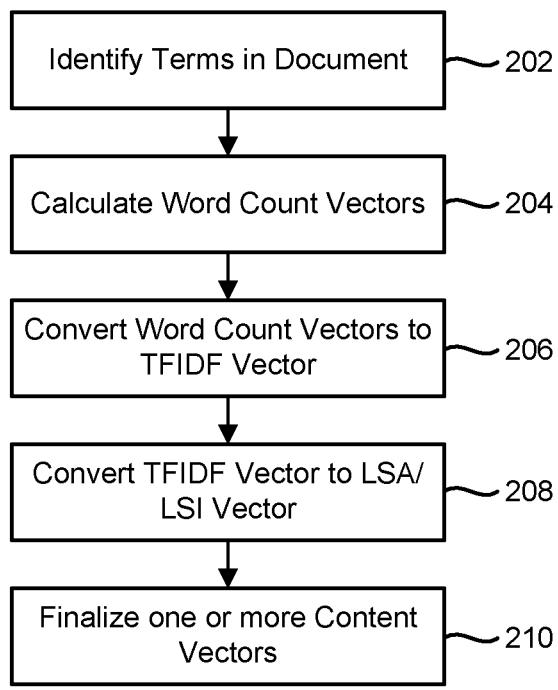
FIG. 7 is a flowchart describing a method of generating content vectors in one embodiment.

FIG. 7 is a flowchart describing a process of generating vectors representing the content in a document such as a web site or page. The process of FIG. 7 may be used at step 188 of FIG. 5 in one example to generate one or more vectors or scores representing the content associated with a target domain name. The process of FIG. 7 may also be used to generate a corpus of information representing malicious content and legitimate content associated with malicious activity.

The system may first retrieve or access content associated with a domain name such as a target domain name to be classified or a reference domain that is to be added or updated in a corpus representing malicious content. At step 202, the system identifies terms in the target or reference document.

At step 204, the system identifies terms from the text in the retrieved content. In one example, the system performs a word count for each term in the target content. At step 204, the system generates one or more word count vectors from the retrieved content. For example, word count vectors may be determined that represent the frequency of the term within the document.

At step 206, the system converts the word count vector(s) into a TF-IDF vector or score. The word count vectors may undergo term frequency (TF) and inverse-document frequency (IDF) analysis and conversion in one example. The TF-IDF analysis may be used to generate a TF-IDF score or vector. The vectors undergo term frequency (TF) and inverse-document frequency (IDF) analysis and conversion in one example. TF-IDF analysis generates a representation of the importance of a term in a collection of documents. It represents a balance between the frequency of terms and their rarity.

The term frequency represents the number of times a term t appears in a document d. A term's relevance does not increase proportionally with term frequency. The inverse-document frequency represents the number of documents that content a term t. A TFIDF score represents the product of the TF weight and the IDF weight. The TFIDF increases with the number of occurrences within a document and increases with the rarity of a term. Equation 1 can be used to calculate the TF-IDF score w for a term t in a document d in one example.

$$w_{t,d} = (1 + \log tf_{t,d}) \times \log_{10}\left(\frac{N}{df_t}\right) \quad \text{Equation 1}$$

At step 208, the TF-IDF vector is converted to a LSA score or vector. The TF-IDF score may undergo a latent semantic analysis to convert the TF-IDF score or vector into an LSA score or vector. The LSA score represents a content analysis that identifies underlying concepts or meanings in the content. The LSA analysis may include a clustering algorithm in one embodiment. Singular value decomposition can be used to identify patterns in the relationships between the terms and concepts contained in an unstructured collection of text. A bag of words model is used in one example. Using n-grams can be used to identify associations using co-occurrences of terms. This can help with data normalization.

In one embodiment, the system performs an LSA analysis using an input matrix X, where m is the number of documents and n is the number of terms. The value of X is given by Equation 2 in one example $$X \approx USV^T \quad \text{Equation 2}$$

The input matrix X is decomposed into three matrices, U, S, and V. U is equal to an m×k matrix, where m is equal to the number of documents and k is equal to the number of topics or concepts. The value of k can be selected to represent the number of topics to be analyzed. S is equal to a (k×k) diagonal matrix where the elements will be the amount of each concept. V (transpose) is equal to a (m×k) matrix where m is equal to the number of terms and k is equal to the number of concepts.

At step 210, the system finalizes one or more content vectors representing the document content. The content vectors may be stored as part of a corpus of malicious content, or used to determine whether a target domain name may be malicious.

Figure 8:
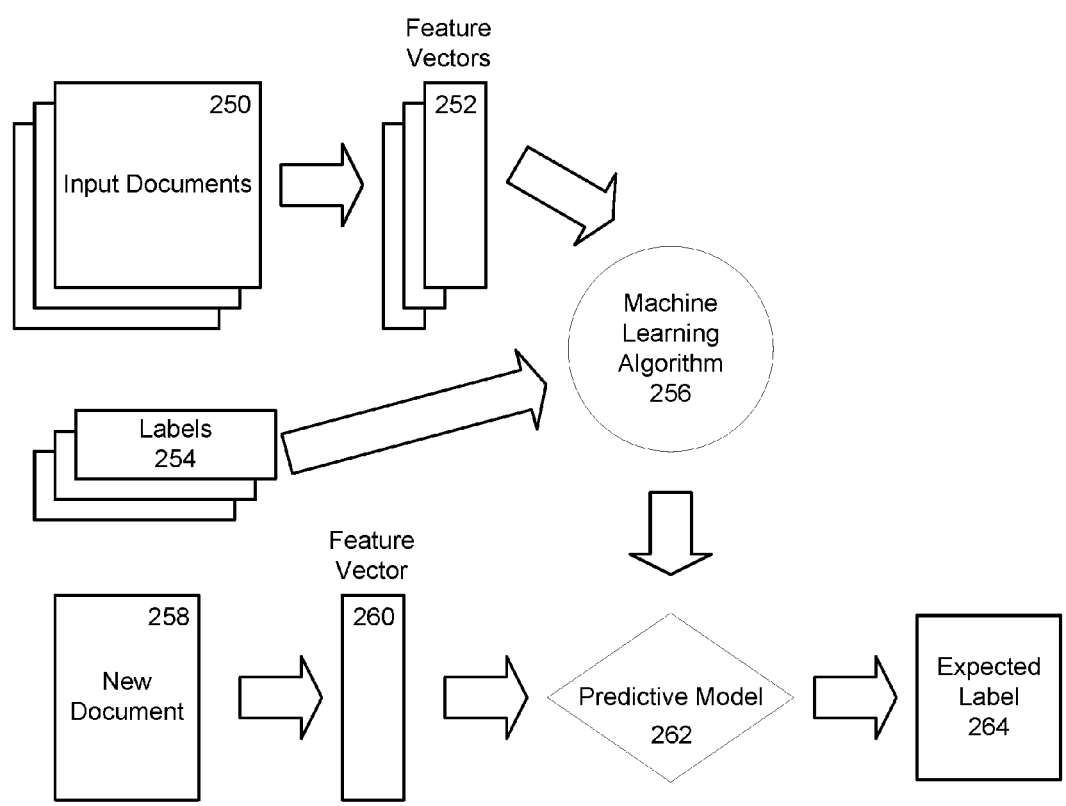
FIG. 8 is a block diagram describing a model for generating a corpus of content vectors in one embodiment.

FIG. 8 is a block diagram describing one process of generating a corpus of malicious content. FIG. 8 depicts a supervised model that may be used to generate a corpus. In another example, an unsupervised model may be used to generate a corpus.

An input set of documents 250, also referred to as a training set, are converted to a set of feature vectors 252. The input documents 250 may include standard text documents, images, video, or any other type of content. A set of labels 254 are also created that describe the content of the input document. For example, the labels may describe the content as a title, a body, an image, or otherwise designate what the content represents. The set of labels 254 and set of feature vectors 252 are provided to a machine learning algorithm (MLA) 256. The MLA utilizes the feature vectors and labels to provide an input to a predictive model 262. The predictive model receives one or more feature vectors 260 generated from new content 258. The new content may include any of the described content with respect to the training input documents. The feature vector, without a label, is provided to the predictive model 262. The predictive model uses the input data from the MLA to generate an expected label 264 for the feature vector.

Figure 9:
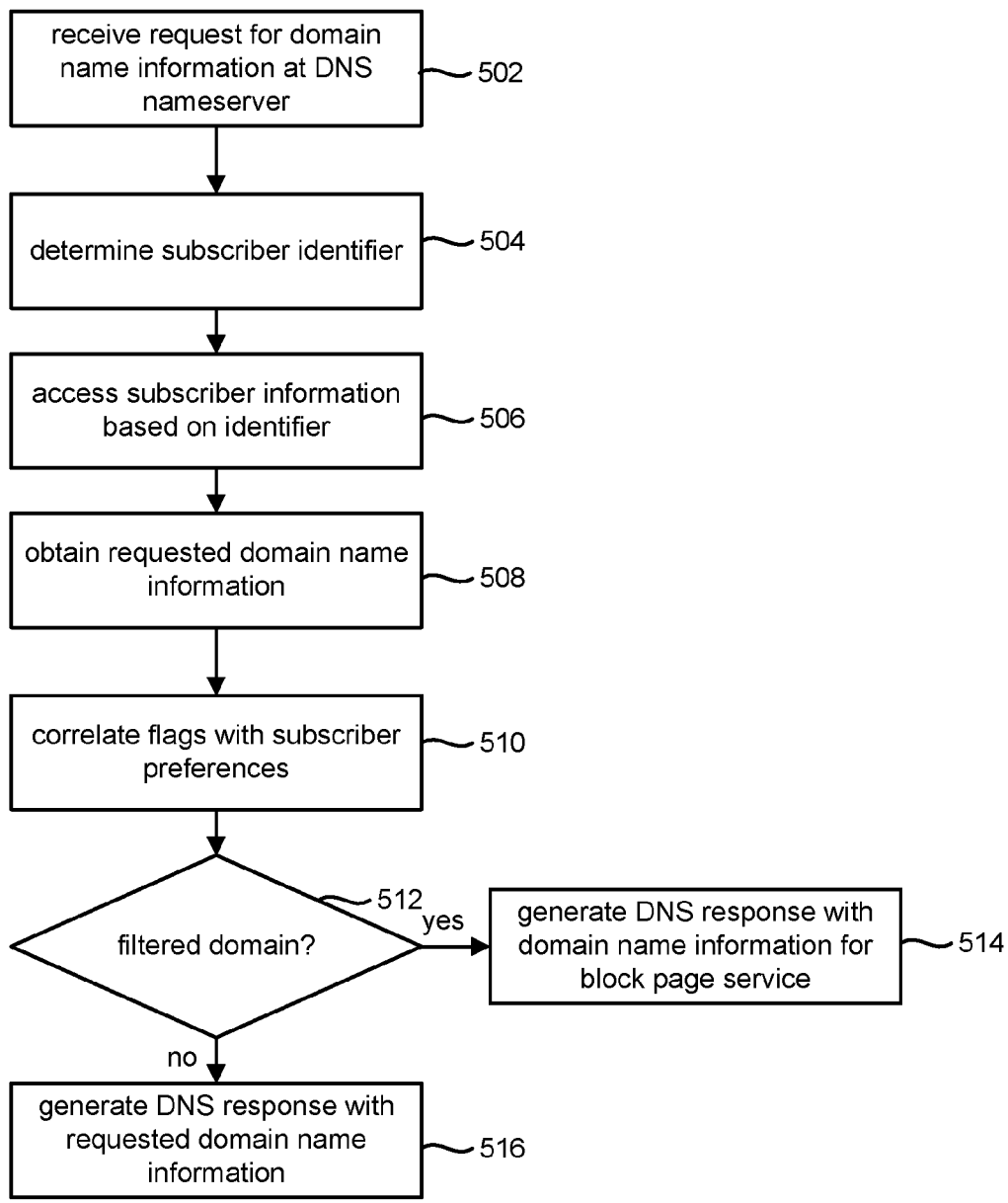
FIG. 9 is a flowchart describing a method of processing a DNS request based on domain classification information in accordance with one embodiment.

FIG. 9 is a flowchart describing a method of processing domain name requests by a recursive DNS cluster in accordance with one embodiment. In one embodiment, FIG. 9 includes using the domain classifications generated at step 114 of FIG. 1. At step 502, a DNS nameserver 332 receives a request for domain name information from a client device 312. In this example, it is assumed that the client device 312 is part of a subscriber network, and thus, that a unique IP address distinguishing the client device from another client device cannot be obtained. At step 504, the DNS nameserver determines a subscriber identifier associated with the DNS request. In one example, the DNS nameserver parses the DNS request for the source IP address which is used as the subscriber identifier. At step 506, the DNS nameserver uses the subscriber identifier to obtain a corresponding network record and/or user record from database 350 to determine subscriber information. At step 508, the DNS nameserver obtains the requested domain name information. Step 508 may include determining the domain in the request for domain name information and checking cache 340 for a domain name record corresponding to the requested domain. If the cache contains a domain name record for the requested domain and the record is not expired, the DNS nameserver obtains the cached domain name record. If the cache does not contain a domain name record for the requested domain or if the domain name record is expired, the DNS nameserver attempts to retrieve the domain name information using one or more authoritative and/or root DNS nameservers.

After obtaining the domain name information, the DNS nameserver determines whether there are any flags associated with the requested domain and if so, correlates the flags with the preferences in the network record 352 at step 510. Step 510 can include determining if the domain information includes a flag indicating that a domain is associated with malware as determined by domain detection engine 372 in one embodiment. Step 510 includes determining whether the domain name information for the requested domain includes any identifiers corresponding to preferences in the subscriber information. For example, step 510 may include determining an age-rating for the domain and comparing that with an age-rating preference in the subscriber information record. Step 510 may also apply system wide preferences, for example for block listed domains or domains otherwise associated with malware. In this instance, the system will generate a response for the block page service in response to all requests for such a domain. In other examples, a subscriber may choose to override or otherwise not have these system wide preferences applied.

If any of the flags correlate to preferences in the network record, the DNS nameserver determines if any of the flags and corresponding network preferences indicate that the traffic to the domain should be filtered at step 512. In one embodiment, step 512 includes determining whether the network records indicate that the requested domain should be blocked for requests from the subscriber's network. Step 512 may also include determining whether the records indicate that traffic for the requested domain should be proxied, but access still allowed.

If the domain name information contains a flag indicating that the requested domain should be proxied or blocked, the DNS nameserver issues a DNS response at step 514 with domain name information for the block page service 336 at web server 334. If the domain is not to be blocked or proxied for the subscriber's network, the DNS nameserver issues a DNS response at step 516 with domain name information for the requested domain.

Figure 10:
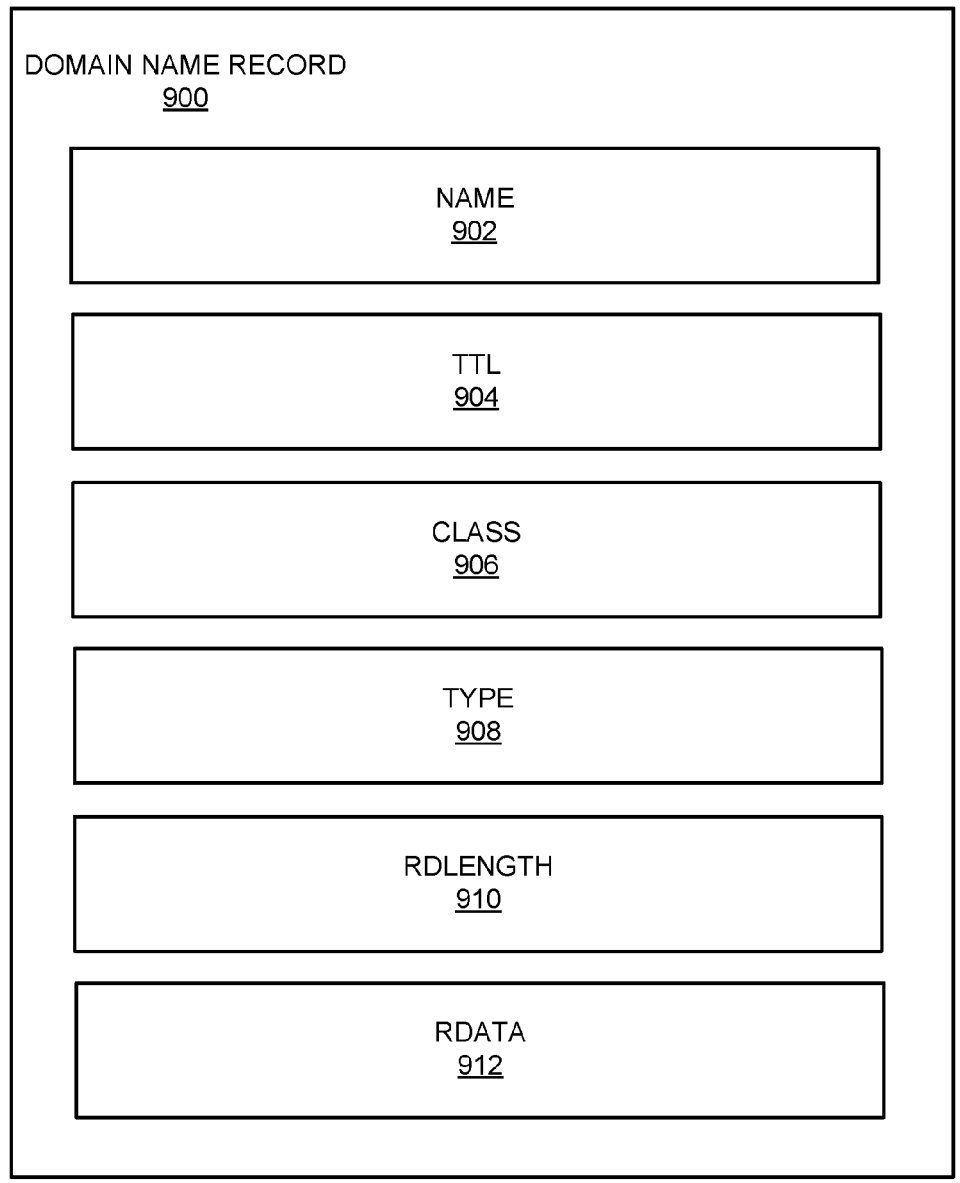
FIG. 10 depicts the structure of an example of a DNS resource record.

FIG. 10 is a block diagram depicting the structure of a domain name resource record that can be stored in the local cache at the recursive DNS clusters. Each resource record includes a name field 902, a TTL field 904, a class field 906, a type field 908, an RDLENGTH field 910 and an RDATA field 912. As earlier described, the TTL field sets the maximum amount of time for maintaining the resource record before it should be treated as invalid and expired. In accordance with one embodiment, the RDATA field is used for various flags that may be set by the recursive nameservers to indicate some additional information about the domain in addition to the standard DNS specified information. A flag can be any indicator, marking or symbol associated with a domain name, such as a binary indicator in part of the RDATA field. The flags may have various functions, including but not limited to marking domain names as suspicious or untrustworthy, such as a web site associated with phishing activities. Flags may be used to indicate various types and levels of information. For information, social networking or pornographic web pages may be flagged so that the nameserver can provide alternate or additional information when a client issues a request.

Figure 11:
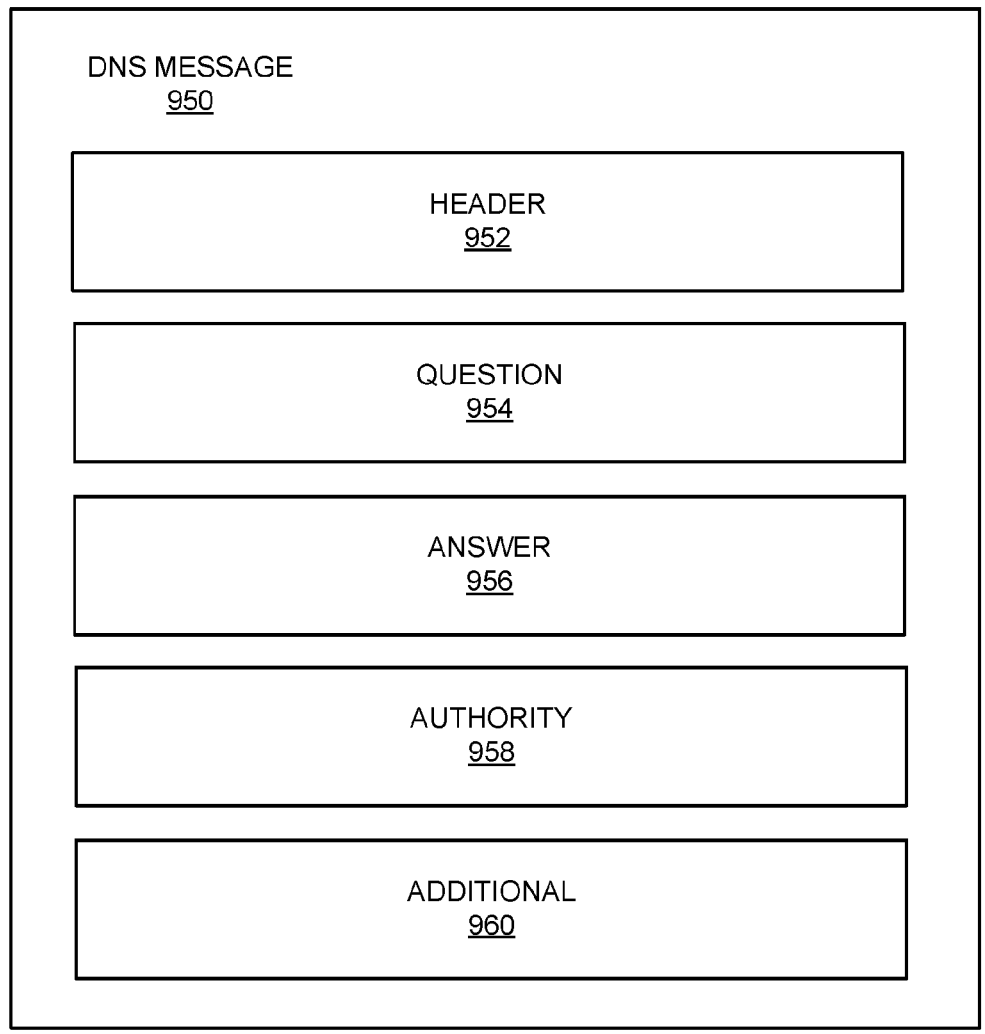
FIG. 11 depicts the structure of an example of a DNS message.

FIG. 11 is a block diagram depicting the structure of a DNS message response or request 950. A DNS message includes a header field 952, a question field 954, an answer field 956, an authority field 958 and an additional field 960. The question field indicates the question for (or request) of the name server in a DNS request. The answer field in a DNS response includes one or more resource records answering a question from a DNS request. The authority field includes one or more resource records pointing to an authority. The additional field is structured like a resource record and can include various types of information, such as the subscriber identifier as described above.

Figure 12:
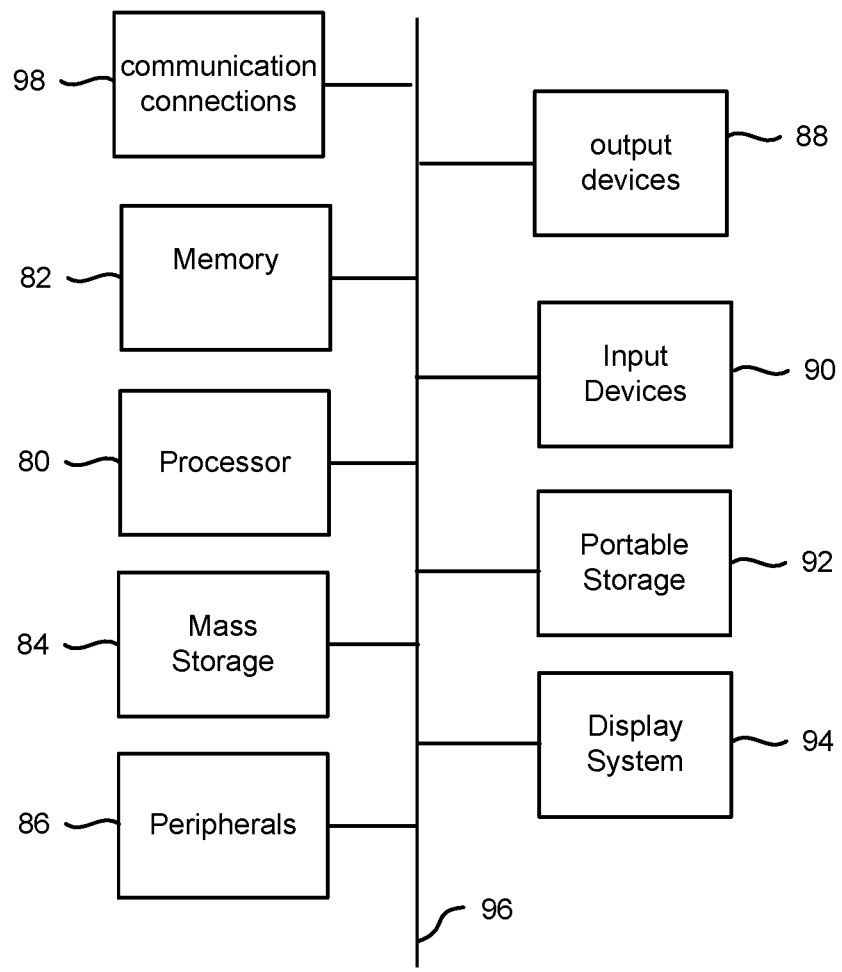
FIG. 12 is a simplified block diagram of a computing device that can be used to implement various embodiments of the disclosed technology.

FIG. 12 is a high level block diagram of a computing system which can be used to implement any of the computing devices of FIG. 2. The computing system of FIG. 12 includes processor 80, memory 82, mass storage device 84, peripherals 86, output devices 88, input devices 90, portable storage 92, and display system 94. For purposes of simplicity, the components shown in FIG. 12 are depicted as being connected via a single bus 96. However, the components may be connected through one or more data transport means. In one alternative, processor 80 and memory 82 may be connected via a local microprocessor bus, and the mass storage device 84, peripheral device 86, portable storage 92 and display system 94 may be connected via one or more input/output buses.

Processor 80 may contain a single microprocessor, or may contain a plurality of microprocessors for configuring the computer system as a multiprocessor system. Memory 82 stores instructions and data for programming processor 80 to implement the technology described herein. In one embodiment, memory 82 may include banks of dynamic random access memory, high speed cache memory, flash memory, other nonvolatile memory, and/or other storage elements. Mass storage device 84, which may be implemented with a magnetic disc drive or optical disc drive, is a nonvolatile storage device for storing data and code. In one embodiment, mass storage device 84 stores the system software that programs processor 80 to implement the technology described herein. Portable storage device 92 operates in conjunction with a portable nonvolatile storage medium, such as a floppy disc, CD-RW, flash memory card/drive, etc., to input and output data and code to and from the computing system of FIG. 10. In one embodiment, system software for implementing embodiments is stored on such a portable medium, and is input to the computer system via portable storage medium drive 92.

Peripheral devices 86 may include any type of computer support device, such as an input/output interface, to add additional functionality to the computer system. For example, peripheral devices 86 may include one or more network interfaces for connecting the computer system to one or more networks, a modem, a router, a wireless communication device, etc. Input devices 90 provide a portion of a user interface, and may include a keyboard or pointing device (e.g. mouse, track ball, etc.). In order to display textual and graphical information, the computing system of FIG. 9 will (optionally) have an output display system 94, which may include a video card and monitor. Output devices 88 can include speakers, printers, network interfaces, etc. Device 100 may also contain communications connection(s) 112 that allow the device to communicate with other devices via a wired or wireless network. Examples of communications connections include network cards for LAN connections, wireless networking cards, modems, etc. The communication connection(s) can include hardware and/or software that enables communication using such protocols as DNS, TCP/IP, UDP/IP, and HTTP/HTTPS, among others.

The components depicted in the computing system of FIG. 12 are those typically found in computing systems suitable for use with the technology described herein, and are intended to represent a broad category of such computer components that are well known in the art. Many different bus configurations, network platforms, operating systems can be used. The technology described herein is not limited to any particular computing system.

The technology described herein, including the domain detection engine, can be implemented using hardware, software, or a combination of both hardware and software. The software used is stored on one or more of the processor readable storage devices described above (e.g, memory 82, mass storage 84 or portable storage 92) to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Computer readable storage media includes volatile and nonvolatile, as well as removable and non-removable media implemented in any non-transitory technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more computer readable media/storage devices, peripherals and/or communication interfaces. In alternative embodiments, some or all of the software can be replaced by dedicated hardware including custom integrated circuits, gate arrays, FPGAs, PLDs, and special purpose computers.

Accordingly, a method has been described that includes performing an analysis of one or more substrings associated with a target domain name relative to a database of malicious substrings, and if the analysis indicates a correspondence with one or more malicious substrings, automatically retrieving content associated with the target domain name and generating one or more vectors based on the content. The method includes comparing the one or more vectors with a corpus of vectors associated with malicious content, and automatically generating a domain classification based on comparing the one or more vectors with the corpus of vectors.

A method has been described that includes automatically retrieving content associated with a target domain name if domain information associated with the target domain name indicates an association with malware, generating one or more vectors based on the content associated with the target domain name, comparing the one or more vectors with a corpus of vectors associated with malicious content, and automatically generating a domain classification based on comparing the one or more vectors with the corpus of vectors.

A system has been described that includes at least one storage device including a plurality of entity identifiers and content information associated with the plurality of entity identifiers. The system includes a processor in communication with the at least one storage device, the processor is configured to automatically retrieve content associated with a target domain name based on a lexical analysis of the target domain name with the plurality of entity identifiers. The processor is configured to compare the content associated with the target domain name with the content information associated with the plurality of entity identifiers. The processor is configured to automatically generate a domain classification based on comparing the content associated with the target domain name and the content information.

The foregoing detailed description has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented method, comprising:
at a domain name system (DNS) computing system that is in network communication with one or more clients that submit DNS requests and in network communication with one or more servers associated with respective domains:
performing an analysis of one or more substrings associated with a target domain name relative to a database of malicious substrings;
when the analysis indicates a correspondence with one or more malicious substrings, automatically retrieving content associated with the target domain name and generating one or more vectors based on the content;
comparing the one or more vectors with a corpus of vectors associated with malicious content, wherein comparing includes determining a similarity score for the target domain name relative to a first document in the corpus and the similarity score is based on a distance between the one or more vectors for the target domain name and one or more vectors in the corpus for the first document; and
automatically generating a domain classification based on comparing the one or more vectors with the corpus of vectors, wherein automatically generating includes automatically generating domain name information for the target domain name indicating an association with malware if the similarity score is above a threshold.

2. The computer-implemented method of claim 1, wherein the similarity score is a cosine distance between the one or more vectors for the target domain name and one or more vectors in the corpus for the first document.

3. The computer-implemented method of claim 1, wherein:
performing the analysis includes performing a lexical analysis to determine if the one or more substrings of the target domain name match a database of malicious terms based on an edit distance calculation.

4. The computer-implemented method of claim 1, wherein:
performing the analysis includes performing a lexical analysis to determine if the one or more substrings of the target domain name match a database of malicious terms based on a regular expression calculation.

5. The computer-implemented method of claim 1, wherein:
performing the analysis includes determining if a first sub string of the target domain name matches a first database of entity identifiers; and
performing the analysis includes determining if a second substring of the target domain name matches a second database of malicious terms.

6. The computer-implemented method of claim 1, wherein:
performing an analysis of one or more substrings associated with the target domain name includes accessing a universal resource locator associated with a first client request; and
the one or more substrings are one or more substrings of the universal resource locator.

7. The computer-implemented method of claim 1, wherein the target domain name is a first target domain name, the method further comprising:
determining an autonomous system number associated with a second target domain name;
determining an entity identifier associated with the second target domain name; and
determining if the autonomous system number is associated with the identify identifier.

8. The computer-implemented method of claim 7, wherein automatically generating a domain classification includes:
performing a textual analysis of one or more substrings associated with the second target domain name relative to the database of malicious substrings if the autonomous system number is not associated with the entity identifier; and
generating domain name information for the second target domain name without performing a textual analysis or retrieving content associated with the second target domain name if the autonomous system number is associated with the entity identifier.

9. The computer-implemented method of claim 1, further comprising:
determining the one or more substrings from the target domain name.

10. The computer-implemented method of claim 1, further comprising:
determining the one or more substrings from a universal resource locator associated with the target domain name.

11. The computer-implemented method of claim 1, further comprising:
receiving a plurality of domain name system (DNS) requests from a plurality of clients for the target domain name; and
generating a plurality of DNS replies for the plurality of DNS requests based on the domain classification for the target domain name.

12. A computer readable storage medium having computer readable instructions for programming a processor to perform a method, the processor being part of a domain name system (DNS) computing system that is in network communication with one or more clients that submit DNS requests and in network communication with one or more servers associated with respective domains, the method comprising:
automatically retrieving content associated with a target domain name when domain information associated with the target domain name indicates an association with malware;
generating one or more vectors based on the content associated with the target domain name;
comparing the one or more vectors with a corpus of vectors associated with malicious content, wherein comparing includes determining a similarity score for the target domain name relative to a first document in the corpus and the similarity score is based on a distance between the one or more vectors for the target domain name and one or more vectors in the corpus for the first document; and
automatically generating a domain classification based on comparing the one or more vectors with the corpus of vectors, wherein automatically generating includes automatically generating domain name information for the target domain name indicating an association with malware if the similarity score is above a threshold.

13. The computer-readable storage medium of claim 12, wherein:
generating the one or more vectors includes a latent semantic analysis of the content associated with the target domain name.

14. The computer-readable storage medium of claim 13, wherein:

generating the one or more vectors includes a term frequency-inverse document frequency analysis of the content associated with the target domain name.

15. The computer-readable storage medium of claim 12, wherein:
comparing the one or more vectors includes determining a similarity score of the content associated with the target domain name relative to malicious content based on a cosine similarity between the one or more vectors and the corpus of vectors.

16. The computer readable storage medium of claim 12, wherein the method further comprises:
extracting one or more substrings from the target domain name; and
comparing the one or more substrings with a database of malicious terms;
wherein said automatically retrieving content is performed is response to a match between the one or more substrings and the database of malicious terms.

17. The computer readable storage medium of claim 12, wherein the method further comprises:
generating the corpus of vectors associated with malicious content based on a semantic analysis of content from one or more legitimate resources.

18. The computer readable storage medium of claim 12, wherein the method further comprises:
receiving a network request;
determining the target domain name based on processing the network request by a web server or a nameserver; and
processing additional network traffic by the web server or the nameserver using the domain classification for the target domain name.

19. A system, comprising:
a network interface configured to enable network communication with one or more clients that submit domain name system (DNS) requests and in network communication with one or more servers associated with respective domains;
a processor in communication with the network interface, the processor configured to perform operations including:
performing an analysis of one or more substrings associated with a target domain name relative to a database of malicious substrings;
when the analysis indicates a correspondence with one or more malicious substrings, automatically retrieving content associated with the target domain name and generating one or more vectors based on the content;
comparing the one or more vectors with a corpus of vectors associated with malicious content, wherein comparing includes determining a similarity score for the target domain name relative to a first document in the corpus and the similarity score is based on a distance between the one or more vectors for the target domain name and one or more vectors in the corpus for the first document; and
automatically generating a domain classification based on comparing the one or more vectors with the corpus of vectors, wherein automatically generating includes automatically generating domain name information for the target domain name indicating an association with malware if the similarity score is above a threshold.

20. The system of claim 19, wherein the processor is configured to perform the analysis by performing a lexical analysis to determine if the one or more substrings of the target domain name match a database of malicious terms based on an edit distance calculation.

* * * * *